Aug. 14, 1928.

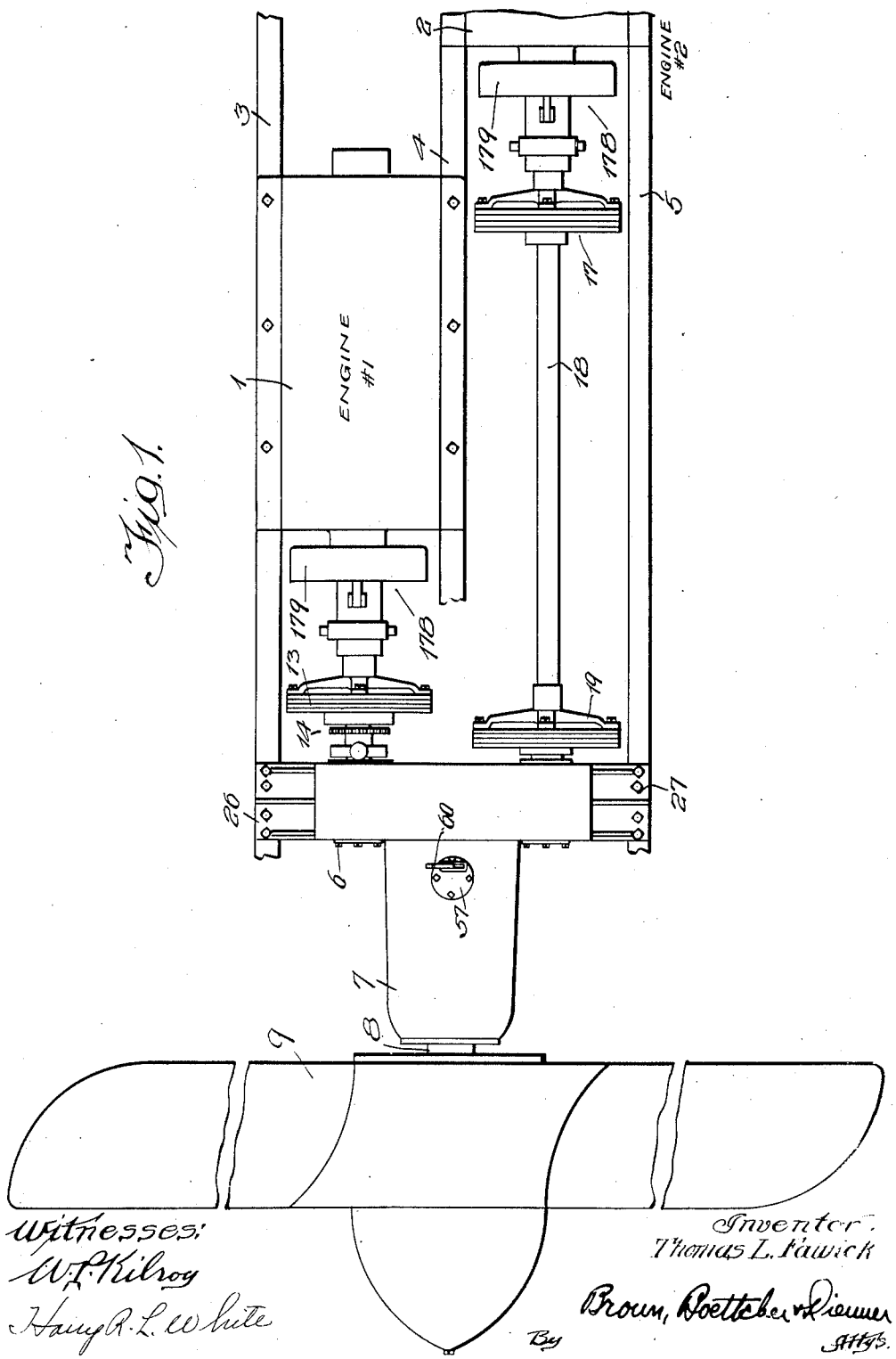

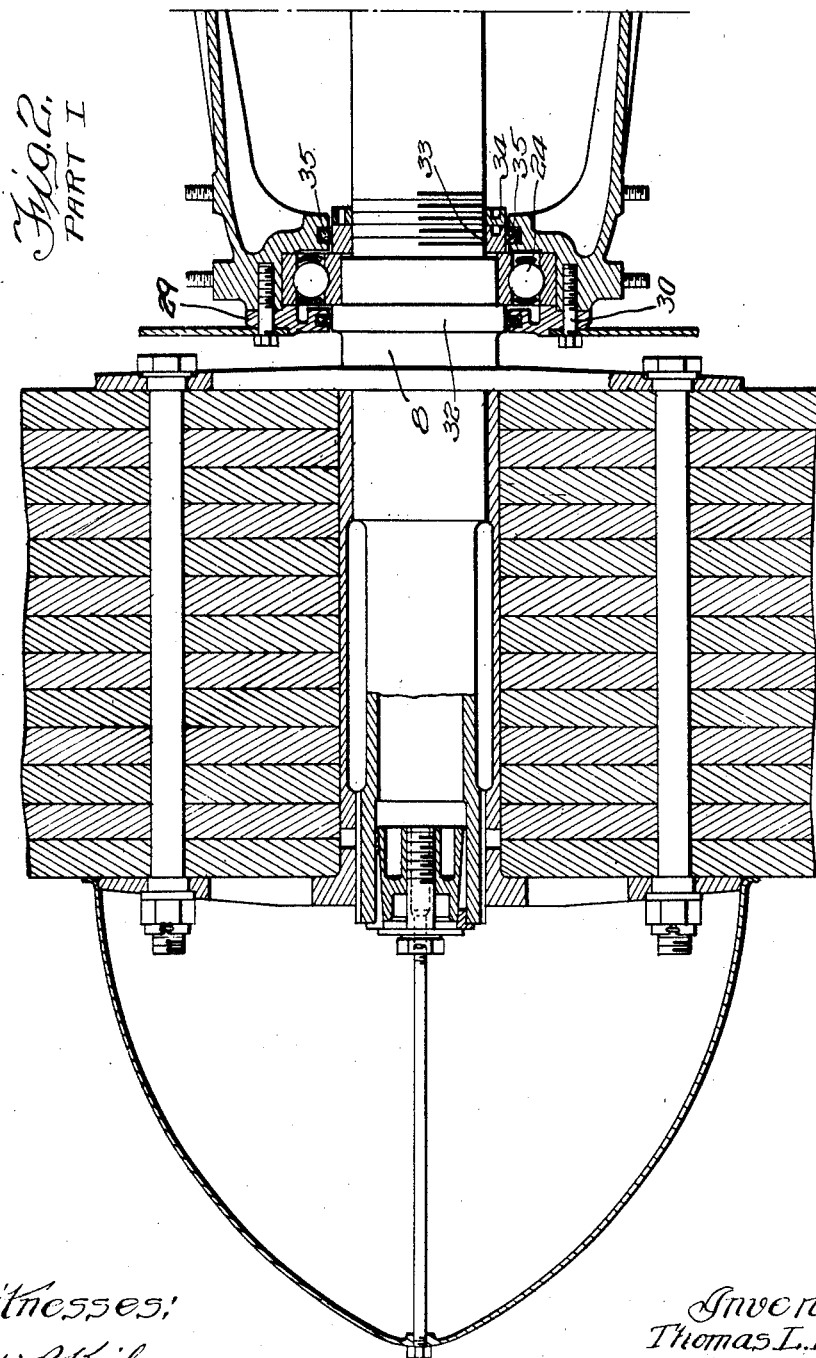

T. L. FAWICK 1,680,672

GEARING

Filed Oct. 15, 1923

PART II

Witnesses:
W. F. Kilroy
Harry R. White

Inventor:
Thomas L. Fawick

By Brown, Boettcher & Dieruer
Attys.

Aug. 14, 1928.

T. L. FAWICK 1,680,672

GEARING

Filed Oct. 15, 1923

Witnesses:
W. F. Kilroy
Harry R. L. White

Inventor
Thomas L. Fawick

By Brown, Boettcher & Dienner
Attys.

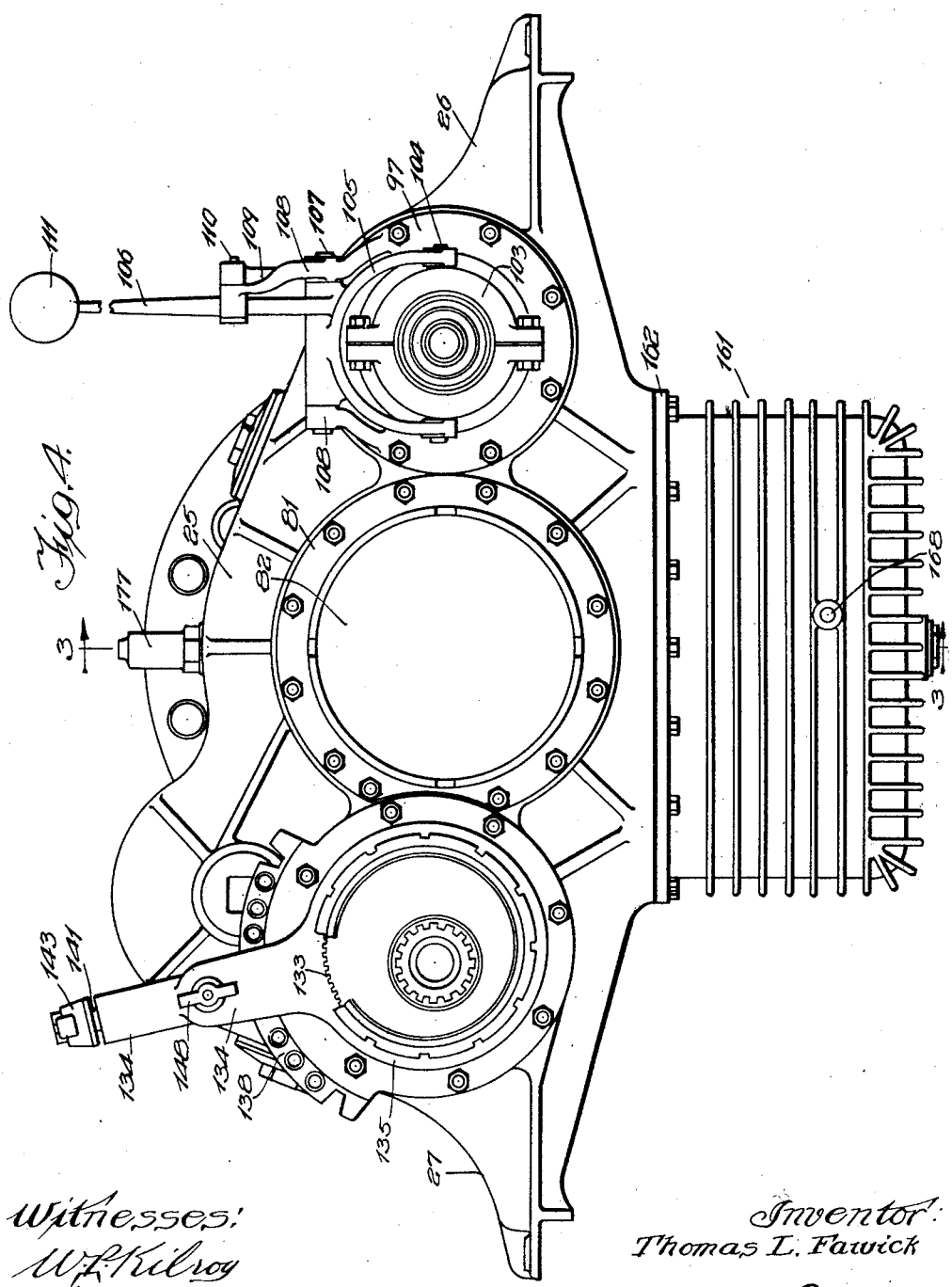

Aug. 14, 1928.
T. L. FAWICK
1,680,672
GEARING
Filed Oct. 15, 1923
8 Sheets-Sheet 6
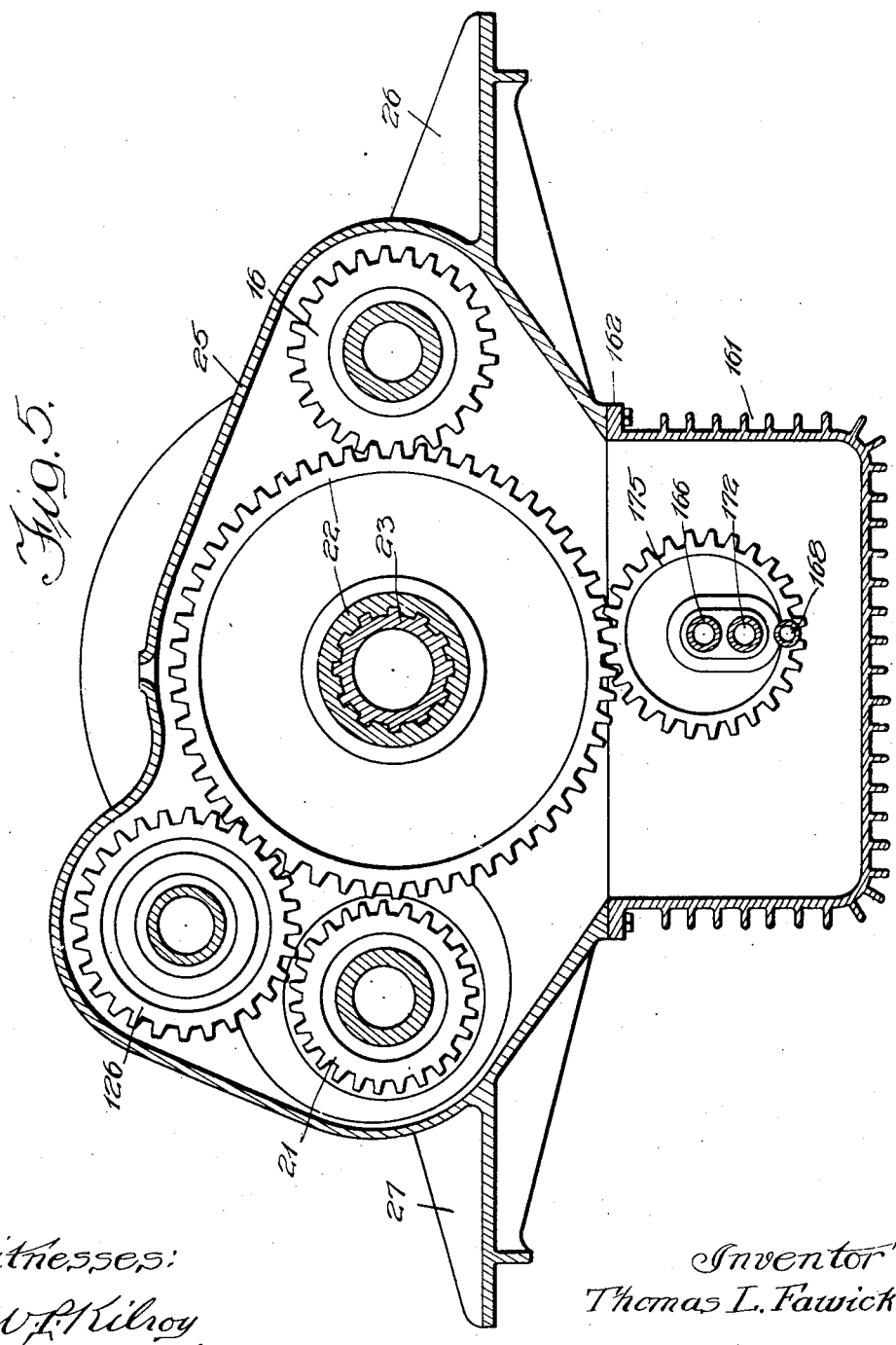

Aug. 14, 1928. 1,680,672
T. L. FAWICK
GEARING
Filed Oct. 15, 1923 8 Sheets-Sheet 7
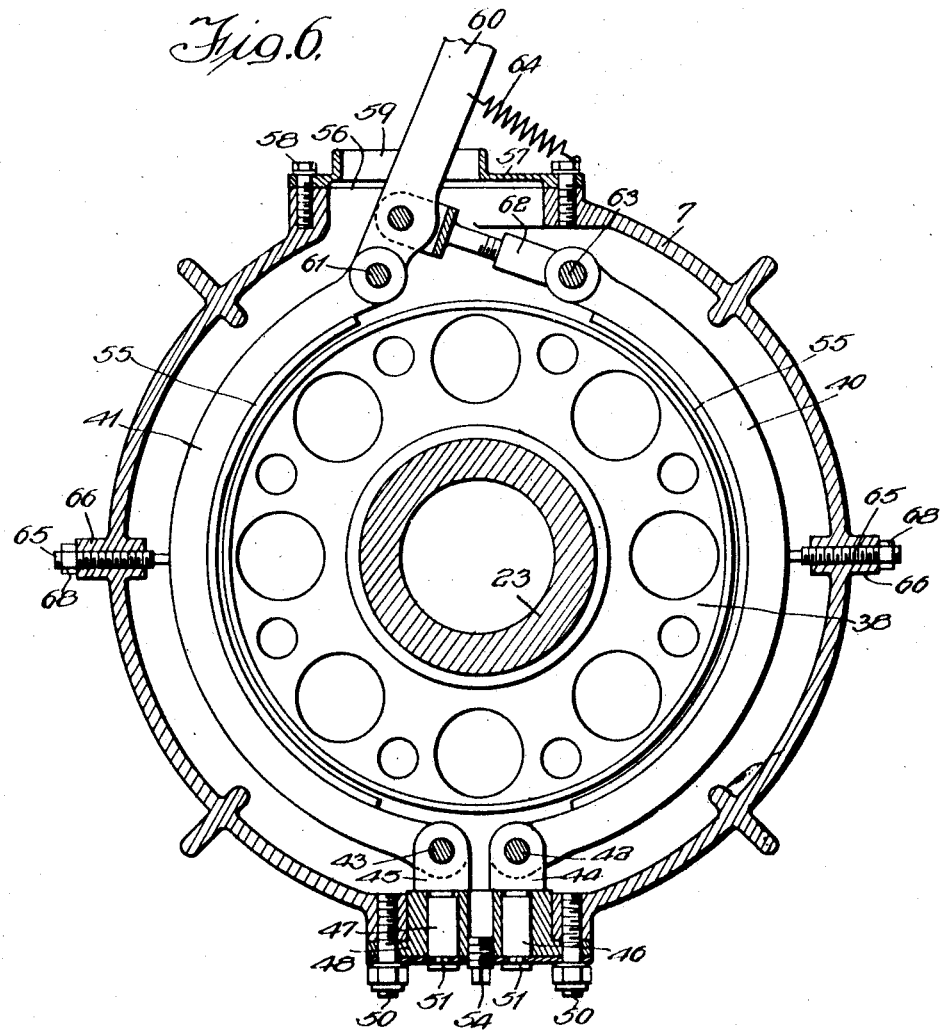
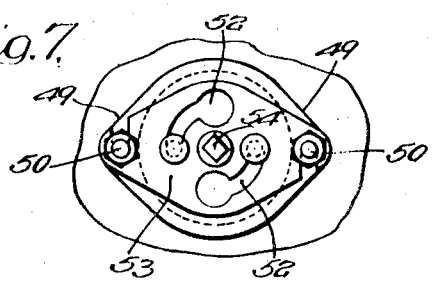
Witnesses:
W. L. Kilroy
Harry R. L. White
Inventor:
Thomas L. Fawick
By Brown, Boettcher & Dienner
Attys.

Aug. 14, 1928.
T. L. FAWICK
GEARING
Filed Oct. 15, 1923
1,680,672
8 Sheets-Sheet 8
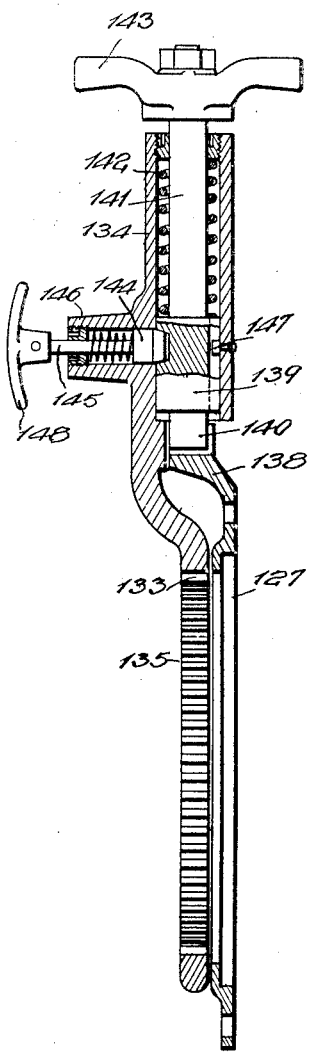
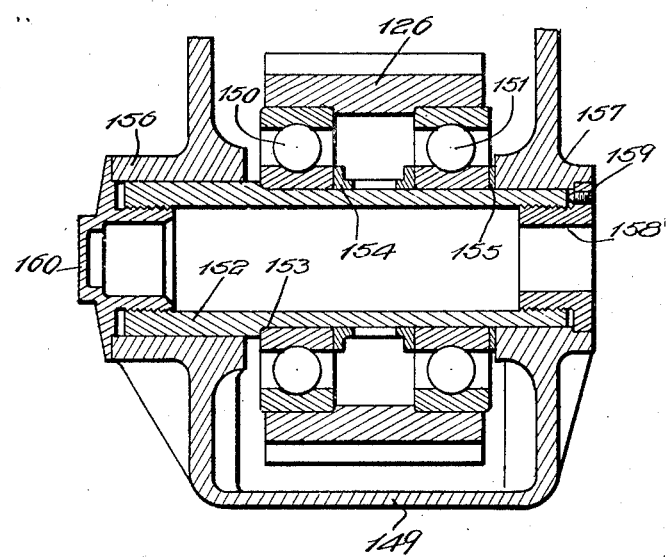
Inventor:
Thomas L. Fawick Patented Aug. 14, 1928.

1,680,672

UNITED STATES PATENT OFFICE.

THOMAS L. FAWICK, OF RACINE, WISCONSIN.

GEARING.

Application filed October 15, 1923. Serial No. 668,502.

My invention relates to gearing. While the particular embodiment which I shall presently describe and illustrate is a transmission for airships, it is to be understood that the invention is not to be limited to transmissions for airships, but may be applied to other uses and the principles which I employ and the means which I provide may be embodied in different constructions from the specific one which I shall hereafter describe.

In airship construction it is often desirable to apply to a propeller more power than a single engine of standard construction can deliver. It is well known that the efficiency of a propeller in air is better in the larger sizes. Furthermore, greater economy is secured by the single mounting of a large propeller than by the separate mountings of a plurality of propellers of the same aggregate power.

The connection of two engines, such for example, as two standard 12-cylinder Liberty engines to a single propeller shaft in constructions of this character presents considerable difficulty. It is necessary to make the transmission as light in weight as is consistent with reliability and safety. The mounting is not secure because of the lightness of the frame members, and yet with the large amounts of power which may be sent through the transmission, any failure to maintain perfect alignment and high efficiency of transmission quickly results in destruction of the transmission mechanism.

In driving lighter than air craft, it is desirable to be able to reverse the propellers for maneuvering purposes. Hence, a forward drive, a neutral position and a reverse drive must be provided and this when considered in connection with two gasoline engines presents a problem of considerable difficulty.

According to my invention I provide two pinions meshing with a common bull wheel for driving the propeller. These pinions are connected to their individual engines, through suitable connections including friction clutches. One of the pinions is fixedly mounted in the transmission case and is always in mesh with the bull gear, but has a releasable jaw clutch to its driving shaft. The other pinion is movably mounted in the transmission case so that it may be meshed with the bull gear or taken out of mesh therewith into neutral position or thrown over into mesh with a reversing pinion which reversing pinion is fixedly journaled in the transmission and is maintained in constant mesh with the bull gear. Thus it can be seen that both engines may be disconnected from the propeller and either one may be connected individually to drive the propeller in forward direction and one of the engines may be connected individually for driving the propeller in a reverse direction. The employment of one engine for reverse driving is sufficient for maneuvering purposes. It will be apparent from the detailed description and drawings that both engines could be coupled in reverse if the same were necessary, but as above pointed out, one engine is sufficient for driving the ship in reverse direction.

The means for taking the one driving pinion from forward driving position to reverse driving position constitutes novel subject-matter, particularly in connection with the manner of mounting the engine. This driving pinion is mounted in an eccentric which may be swung around into various angular positions to mesh said pinion first with the bull gear, and second, out of mesh with both gears, and third, in mesh with the reverse gear. In its various positions, this pinion is always maintained in a position parallel to the axis of the bull wheel and propeller shaft. This means that the pinion is moved laterally in going from one position to another. To permit this, it is necessary to provide some means for having a transmission shaft between the corresponding engine and said pinions which will permit of such lateral movement and which will permit of driving of the pinion when moved to said reversed position. It is within the scope of the present invention to move said movable pinion axially into mesh with its cooperating gears instead of radially.

In order to make as compact an arrangement of the engines and transmission as is possible, it is desirable to keep all of the gears at a minimum diameter. It is also desirable to keep them at a minimum width but for a different reason. If the bull gear is to be kept relatively small in diameter the spacing between the driving pinions becomes too small to permit the Liberty engines to be placed side by side, and I take advantage of this fact in staggering the engines in the frame and thereby providing a relatively long propeller shaft between the remote engine and the movable pinion, inserting a pair of flexible couplings in said relatively long propeller shaft to permit the movable pinion to be thus moved laterally to the neutral or reverse position and to be driven when in the reverse position.

This pair of flexible couplings renders the relatively long driving shaft flexible in itself.

In order to acquaint those skilled in the art with the manner of constructing and operating my invention, I shall now describe in connection with the accompanying drawings a specific embodiment of my invention.

In the drawings:

Figure 1 is a diagrammatic plan view of a power plant involving a pair of driving engines, a transmission and a propeller embodying my invention;

Figure 4 is a rear elevation looking towards the propeller;

Figure 5 is a transverse section taken through the casing and gears;

Figure 6 is a transverse section through the brake taken on the line 6—6 of Figure 3;

Figure 7 is a fragmentary bottom elevation of the means for mounting the brake shoes;

Figure 8 is a longitudinal sectional view through the eccentric shifting lever; and Figure 9 is a fragmentary sectional view through the reverse gear idler.

Figure 2:
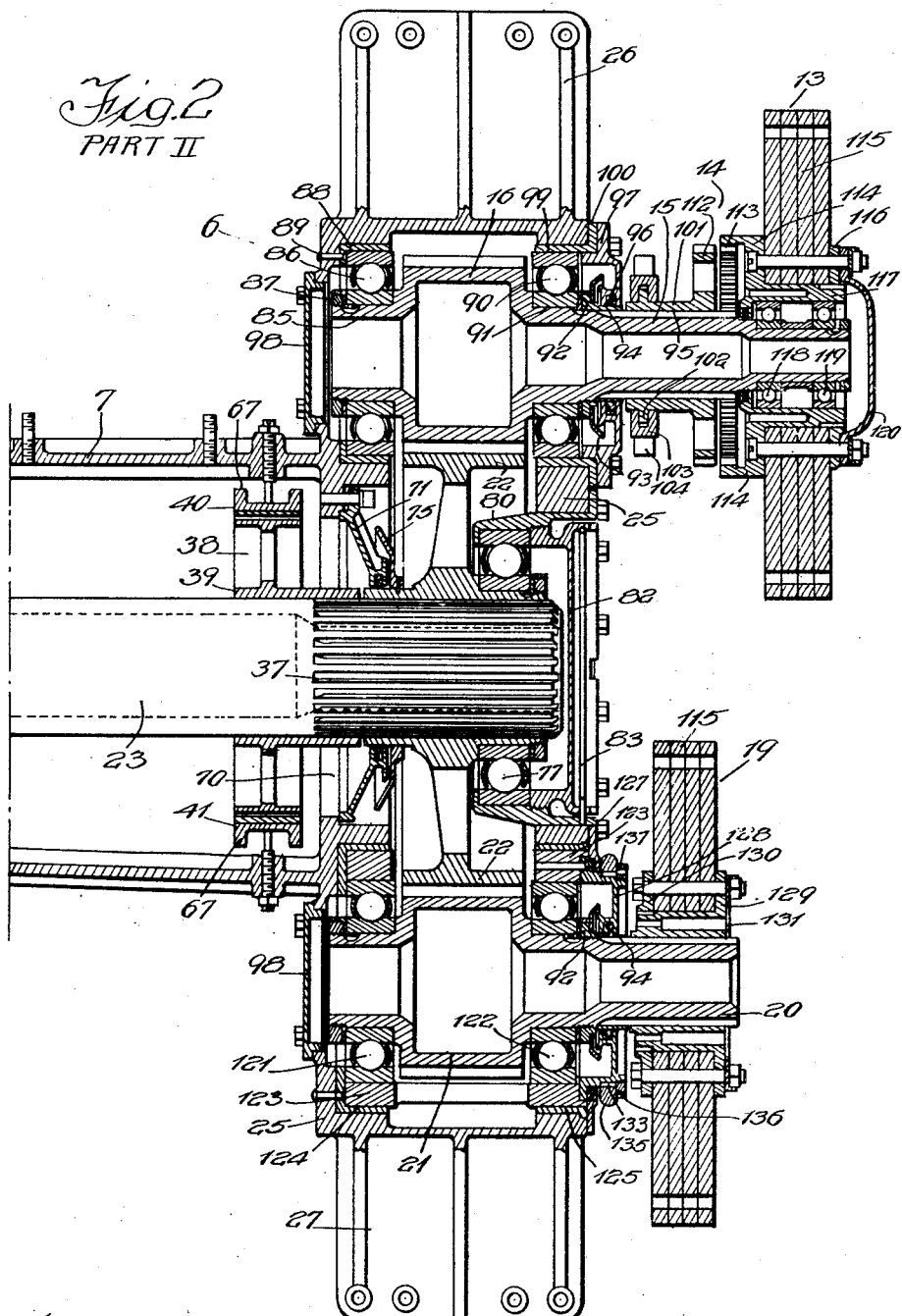
Figure 2 is contained on two sheets and comprises Part I and Part II, and it consists of a horizontal longitudinal section through the transmission taken on the line 2—2 of Figure 3.
Figure 3:
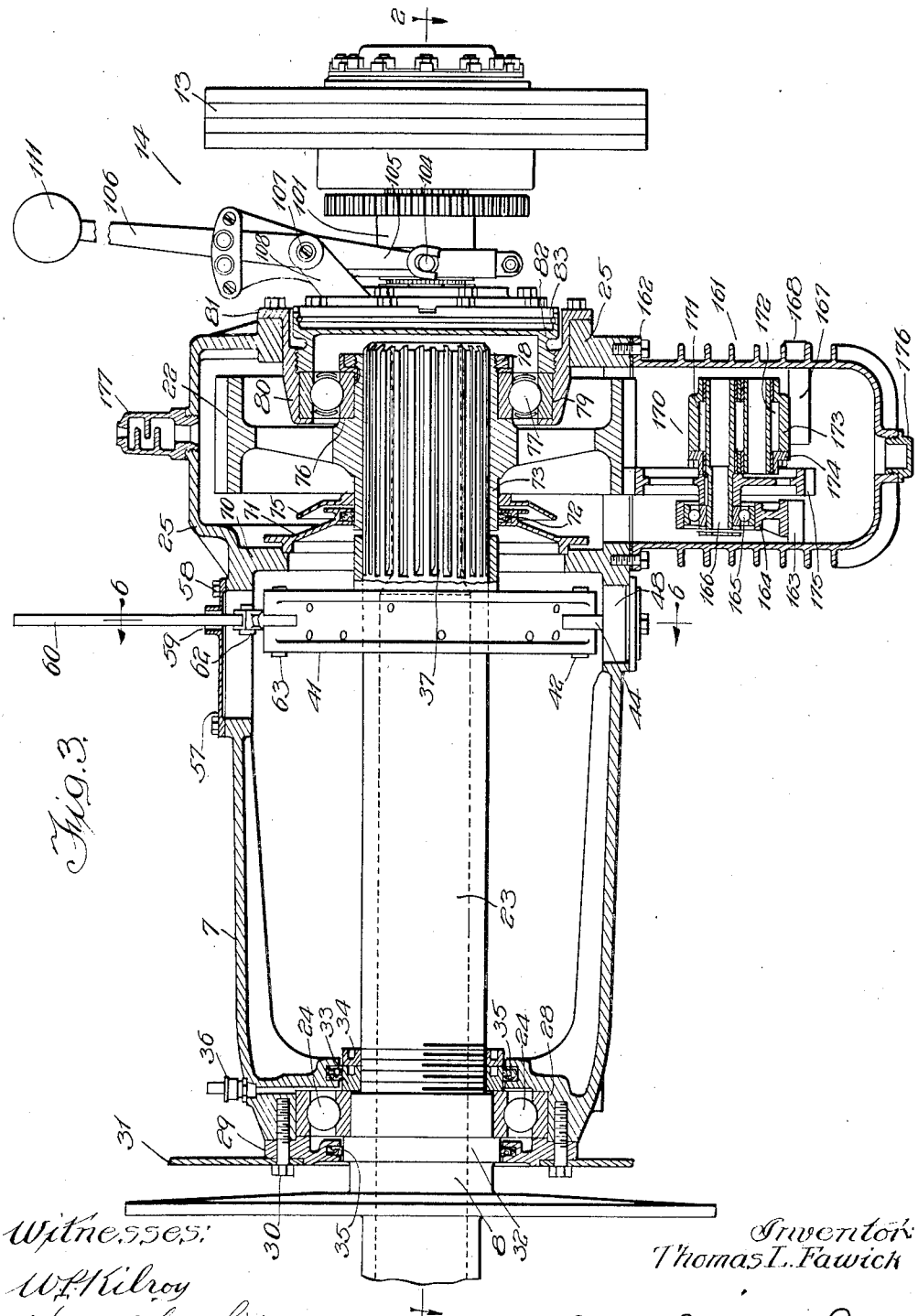
Figure 3 is a vertical longitudinal median section taken on the line 3—3 of Figure 4.

In addition to the general features of novelty above outlined, the present embodiment involves a number of important structural improvements which constitute parts of the present invention and which I shall claim herein.

Referring now to Figure 1, it will be seen that I have provided two engines 1 and 2 which are mounted upon three frame members, namely the longitudinal sills 3, 4 and 5, and are staggered with respect to each other. The transmission 6 is mounted upon the sills 3 and 5 and it comprises a forwardly extending housing 7 containing a propeller shaft 8 which bears the propeller 9. This propeller 9 and the manner of mounting it upon the shaft 8 form no part of the present invention. The engines 1 and 2 are of such width that they could not successfully be mounted side by side without interfering with each other and necessitating a considerably wider mounting and a considerably wider spacing of their respective driving shafts 10 and 11.

The engine 1 is connected by a flexible coupling 13 and a jaw clutch 14 to the shaft 15 of the first driving pinion 16.

Each of the engines is provided with a suitable friction clutch mechanism 178 disposed in the corresponding fly wheel 179 for disconnecting the corresponding engine from its shaft so that changes in the driving connections may be made without stopping the engines.

The shaft 11 of the engine 2 is connected through a flexible coupling 17 to the hollow transmission shaft 18, and this in turn is connected through flexible coupling 19 to the shaft 20 of the second pinion 21. The driving pinions 16 and 21 mesh with the bull gear wheel 22 which gear wheel is splined upon the propeller shaft 23. The driving pinion and the driven gear are mounted in a gear case and frame 25 which has the forwardly extending integral portion 7 for supporting the front end of the propeller shaft 23, by means of the ball bearings 24. This housing 25 also forms a frame. It has the extending lugs or brackets 26 and 27 by which the transmission is mounted upon the frame members 3 and 5.

At its forward end the projecting portion 7 of the housing contains a seat 28 for the outer race of the bearing 24 and a retainer ring 29 is bolted to the front end of said extension 7 for holding said outer race in place. The cap screws 30 which hold this retainer ring in place are adapted also to secure the plate 31 forming a part of the car or protecting housing for the transmission. The inner race of the bearing 24 rests against an integral collar 32 formed on the propeller shaft and a suitable retainer ring is threaded at 33 upon the propeller shaft and a lock ring 34 holds it in place. Suitable felt washers bear against the collar 32 and the retainer ring 33 to exclude foreign matter from the bearing 24. This bearing is adapted to be lubricated by means of hard grease or the like, and to this end a suitable fitting 36 is provided in the top of the extension 7 above said bearing. The rear part 23 of the propeller shaft 8 is splined as indicated at 37. This shaft is carefully ground both on its circumferential surface and on the splines in order to secure a careful fit with the co-operating parts. A brake drum 38 having a hub 39 extending sufficiently to the rear to engage the ends of the splines 37 is mounted upon the rear end 23 of the propeller shaft. The forward part of the hub 39 extending sufficiently to the rear to engage the ends of the splines 37 is mounted upon the rear end 23 of the propeller shaft. The forward part of the hub 39 has a cylindrical bore which fits very closely upon the cylindrical surface of said shaft 23. This brake drum 39 is thereby mounted upon and secured to the propeller shaft. The rear part of the hub 39 has inwardly extending teeth which engage in the splines 37 as will be understood by those skilled in the art. A pair of brake shoes 40 and 41 co-operate with the drum 38 for slowing down or stopping the propeller shaft when it is desired to change the driving connection. The lower ends of the brake shoes 41 and 40 are pivoted at 42 and 43 to the brake shoe anchor bolts 44 and 45 which have the cylindrical extensions 46 and 47 extending down into the brake shoe anchor plug 48 which is set into a hole in the bottom of the extension 7. This plug has laterally extending ears 49 which form bolting flanges co-operating with the studs 50 for bolting said anchor plug in place. The lower ends of the anchor bolts 46 and 47 have reduced necks 51 which are adapted to be caught in the keyhole slots 52 formed in plate 53 which plate is clamped in place under the nuts which are threaded on the stud 50. A central pipe plug 54 is threaded into a central opening in the anchor plug 48 for draining any oil which may collect in the bottom of this extension 7.

The brake shoes 40 and 41 are lined as indicated at 55 with suitable brake lining material such as asbestos composition or the like which is preferably in fabric form and is riveted by hollow rivets or the like to the inner surfaces of the brake shoes 40 and 41. The housing extension 7 has an opening 56 over the brake shoes 40 and 41, this opening being closed by a suitable circular cover 57 held in place by cap screws 58. This cover has a slot 59 through which extends the operating brake handle 60. This brake handle 60 is in the form of a bar pivoted at its lower end by means of the pin 61 to the brake shoe 41 and connected to the adjustable link 62 to the pin 63 which connects with the other brake shoe 40. Thus, by throwing the brake lever 60 to the left as viewed in Figure 6, the shoes are clamped upon the drum 38. A suitable spring 64 is preferably provided for throwing the brake shoes out of contact with the drum 38. For the purpose of guiding these brake shoes in their movement to and from contact with the drum and also for regulating the travel of these shoes so that they will stand normally out of contact on each side, I provide the brake shoe adjusting screws 65 which extend in through suitable lugs 66 and engage between the flanges 67 formed on the margins of said brake shoes as will be apparent from Figure 2 Part II. Locking nut 68 locks these adjusting screws in place.

The main part of the casing 25 is divided off from the forward extension by a wall formed in part by the inwardly extending flange 70 and in part by the circular plate 71. The circular plate 71 is bolted to the wall 70 and it bears at its inner periphery the felt sealing ring 72 which bears upon the outer periphery of the hub 73 of the bull gear wheel 22. The opening in the wall 70 is of a sufficient size to permit the brake drum 38 to pass therethrough. An oil throwing disc 75 is mounted upon the hub 73 and its purpose is to keep oil from passing by the felt washer 72.

The opposite end of the hub 73 provides a seat 76 for the inner race of the ball bearing 77. A retaining ring 78 is threaded upon the outer end of the hub for retaining said inner race of the bearing 77 in place. The outer race of the bearing 77 is mounted in a seat 79 formed in an inwardly extending barrel 80 which has a bolting flange 81 for bolting this barrel to the outer surface of the case 25. The opening in the case 25 into which the barrel 80 fits is of a size sufficient to pass the brake drum 38. A threaded cap 82 is threaded into the inside of said barrel 80 for retaining the outer race of the bearing 77 in its seat 79. This cap is suitably locked by a wire ring 83 to said barrel member 80. The transmission housing 25 with its extending brackets and forwardly extending portion 7 is all formed integral preferably of a light metal such as aluminum or an alloy thereof, and this case and its extensions are suitably strengthened wherever practicable by properly formed ribs and reinforcements.

It will be observed that the bearing 24 at the front end of the housing extension 7 must take both the axial thrusts of the propeller and the radial stresses of the same. The bearing 77 at the rear end of the shaft 23 has the duty first of all of guiding the rear end of the propeller shaft 23 about the bearing 24 as a fulcrum, and in addition it has the duty of supporting a part of the load of the gear wheel 22 as driven by the driving pinion. The other part of the load of the gear wheel 22 is taken at the forward bearing 24. Thus it will be seen that each of these bearings partake of a dual load. The bearing 77 also takes whatever endwise thrust there might be imposed upon the bull gear 22.

The first driving pinion 16 is formed integral with its shaft 15. This pinion and shaft are made hollow to secure lightness. At its rear end this pinion 16 has the stub shafts 85 which form the seat for the inner race of the ball bearing 86. This inner race is held in place by a locking ring 87 which is threaded upon the outer end of said stub shaft 85. The outer race is seated in a steel cage 88 which is secured in a suitable seat in the housing 25 and riveted thereto as indicated at 89.

The pinion 16 has a front bearing at 90, the inner race of which is held in its seat 91 by means of a locking ring 92 which is threaded upon the adjacent portion of said pinion shaft 15. These locking rings such as 87 and 92 are suitably locked in place by sheet metal rings having bendable lugs or gears. An oil throwing disc 93 is secured to said locking ring 92 for keeping oil from the interior of the transmission casing from escaping along the shaft 15. To this end also, the locking ring 92 has a cylindrical extending flange 94 which extends out over the splines 95 in said shaft 15, and in connection with the felt washer 96 held on the interior periphery of the cover plate 97 forms a tight closure for the casing at this point. The opposite side of the casing 25 is closed by the cover plate 98. The outer race of the bearings 90 is mounted in a similar cage 99 which has an extending flange 100 clamped under the flange of the cover plate 97.

As previously pointed out, the shaft 15 is provided with multiple splines which mesh with suitable teeth formed on the inside of the clutch sleeve 101. This clutch sleeve has a flange 102 embraced by a suitable shifting collar 103 having the shifting pins 104. The collar 103 is split into halves so that it may suitably be applied upon the ring or flange 102. A suitable shifter fork 105 engages the pins 104. This shifter fork is formed integral with the clutch lever 106 which is pinned at 107 in a bracket 108 forming a part of the cover plate 97. The bracket 108 has an extension 109 forming a guide for the shifter lever 106 and this guide contains a spring catch 110 for holding the shifting lever 106 yieldingly in either in or out position. The upper end of the clutch lever 106 is provided with a suitable knob or handle 111. A clutch sleeve 101 has a suitable flange 112 provided on its periphery with gear teeth which mesh with the gear teeth 113 formed upon the interior of the co-operating clutch member 114 which forms a part of the coupling 113. This coupling 113 preferably comprises a plurality of flexible discs made of suitable fabric 115, these discs having their inner periphery clamped between the clutch member 114 and a suitable clamping ring 116 which ring 116 is keyed as by suitable splines to the central hub or cylinder 117 forming an extension of the clutch part 114. The clutch member 114 is mounted upon the outer end of the shaft 15 by means of the two sets of ball bearings 118 which are suitably secured upon a reduced portion of the outer end of said shaft 15, the inner races of which bearings are suitably held upon said reduced extensions and the outer ends of which ride relatively freely within the interior of the hollow hub member 117. This hub member has an inwardly extending flange at its inner end terminating in a felt washer to form a dust and grease tight joint so that a suitable lubricant may be retained in contact with the bearings 118 and 119. A cover plate 120 covers the outer end of said shaft 15 and the adjacent bearings 118 and 119 to form a relatively tight case.

The pinion 21 is mounted on bearings 121 and 122 in a manner previously described, but instead of being mounted directly in the frame or casing 25, this pinion has its bearings in an eccentric 123 which forms a cage rotatable in the rear and front bearing cages 124 and 125 which in turn are mounted directly in the casing 25. This eccentric is, as its name implies, adapted to shift the axis of the pinion 21 and its shaft 20 in a parallel position by a motion of translation to take the pinion out of mesh with the bull gear 22 and into neutral, or to shift it further into mesh with the reverse gear 126.

The eccentric 123 is retained in its seat by an eccentric retainer ring 127 which is bolted to the housing 25, and which has a suitable felt washer for making the joint between it and the eccentric grease and dust tight. The eccentric 123 has connected thereto the eccentric cover 128 which has a flange extending under the retaining ring 127 riveted to the eccentric 123 as will be apparent from Figure 2 Part II. This cover has an inwardly extending web terminating in a felt washer for maintaining a dust and grease tight joint between the cover 128 and the extending collar 94 of the bearing retainer nut 92 which is constructed substantially as the like numbered part upon the first pinion and its shaft. The coupling 19 similarly comprises a plurality of flexible discs 115 preferably made of a suitable fabric bolted at their inner peripheries between the flange 129 and a co-operating clamping ring 130. The flange 129 is integral with the hub 131 which is splined upon the hollow shaft 20 which in turn is integral with the pinion 21. The eccentric cover 128 has a plurality of clutch teeth 133 disposed about its periphery, these teeth being in the nature of multiple splines and the operating handle 134 for operating said eccentric has a circular yoke 135 provided with co-operating teeth and splines to connect said operating lever 134 to the eccentric. A locking nut or ring 136 is threaded upon the outer edge of said cover 128. This locking ring 136 may in turn be held against release by a set screw 137.

The eccentric retaining ring 127 has a quadrant 138 containing three notches. The central notch corresponds to neutral position of the transmission. The right-hand notch as viewed in Figure 4 corresponds to reversed condition of the transmission and the left-hand notch as viewed in Figure 4 corresponds to forward driving condition. It will be noted that when the handle 134 is thrown over to the left to put the transmission in forward driving condition, the axis of the pinion 21 is then exactly in line with the axis of the driving motor 2. The operating lever 134 contains a spring pressed plunger 139 terminating in a latch 140 adapted to engage the notches in the quadrant 138. The upper portion 141 of the plunger 138 is reduced in diameter to make room for the spring 142 which urges the plunger into downward position and holds the pawl 140 into the notch in the quadrant. At its upper end and outside of the lever 134 the plunger is provided with a suitable handle 143 by which the plunger may be raised against the spring 142.

I have provided a locking pawl 144 which is mounted on the end of a cross plunger 145 in a laterally extending boss 146 formed on the side of the operating lever 134. This pawl 144 is adapted to enter a notch in the plunger 139, said latter plunger being guided vertically by means of a pin 147 playing in a slot in the plunger to keep the hole in the plunger 139 in line with the pawl 144. A suitable handle 148 permits the plunger 145 and its pawl 144 to be withdrawn laterally so that the plunger 139 may be withdrawn and the lever 134 moved.

The reverse gear idler 126 is mounted with its axis above the axis of the other gears heretofore mentioned, and it is housed in an upward extension 149 of the casing 25. This gear 126 comprises a hollow rim providing seats for the roller bearings 150 and 151. The outer races of said bearings 150 and 151 are seated inwardly against shoulders formed on the inner periphery of said gear 126 and the inner races of said bearings are mounted upon a hollow pin 152 which has a shoulder 153 at one end for engaging the inner race of the bearing 150. The inner rings of the bearings 150 and 151 are spaced apart by a spacing collar 154 and a washer 155 lies between the inner ring of bearing 151 and the adjacent hub or boss on the casing extension 149. It can be seen that in assembling these parts the idler gear 126 is first put into place in the extension with the bearings 150 and 151 in place therein. The pin 152 is then inserted from the left as viewed in Figure 9 and threaded through the inner race of the bearing 150 through the spacing washer 154, through the inner race of bearing 151, washer 155 and then through the hole in boss 157. A plug 158 is then threaded into the open end of the hollow pin 152 with its flange seated in a counterbore in the boss 157 to draw the shoulder 153 against the bearings and to hold said bearings and spacing washers in place. This plug is then locked in place by a set screw 159.

The front end of the hollow pin 152 and the boss 156 are closed by a cap 160.

In order to provide the gears with a suitable lubricant, I have provided an oil sump formed in the shape of a ribbed cup or casing 161 having a flange 162 at its upper end bolted to the bottom of the main casing or frame 25 which is open at the bottom. This sump is adapted to contain a suitable quantity of oil or other lubricating material. Within the sump 161 I have mounted a bracket 163 for mounting a pedestal or bearing frame 164 containing the ball bearing 165 for pump shaft 166. Upon the opposite wall I have provided a similar bracket 167 which is hollow and contains an outlet passageway 168. Upon the bracket 167 is mounted a gear pump 170 having a pinion or gear 171 formed integral with the driving shaft 166 and a similar gear 172 formed integral with the driven shaft. These gears move within a suitable housing or casing 173 having a suitable cover 174. A small gear wheel 175 mounted on the driving shaft 166 is in constant mesh with the bull gear 22. The bottom of the sump 161 is provided with a suitable outlet opening closed by a removable plug 176. The oil from a delivery passageway 168 may be piped to any suitable point for lubricating the gears and bearings.

The gear pump with its gear is assembled and mounted in the sump 161 and then the sump is bolted to the bottom of the case 25.

The assembly of the device is of interest. The assembly of the reversed idler in place has previously been described. The first driving pinion is assembled as follows: The bearing 86 is first put into place, the cap 98 being open, the stub shaft 85 is then put in place in the inner ring of the bearing 86 and the locking ring 87 secured in place. The front bearing 90 is then put into its cage 99 and on its seat 91 on the shaft 15 whereupon the lock ring for the inner race is secured in place. Then the cover 97 is put on and the cap 98 also put on the opposite side to close in this pinion and its bearing. Thereafter the clutch sleeve 101 is put on the splines and thereafter the clutch housing 114 together with the flexible couplings and bearings are put in place upon the end of said shaft 15.

The assembly of the second driving pinion is somewhat similar, the rear bearing 121 being first mounted in the eccentric, then the rear end of the shaft inserted in the inner bearing, the lock ring for the inner race being put in place, thereafter the front bearing being put in place on the shaft 20 and in the eccentric 123. The eccentric cover is then pinned by means of the pins or rivets previously described. The eccentric 123 with its pinion and bearings in place is then mounted in the cages 124—125 in the housing 25 and the cap at the rear closed and the eccentric retainer ring 127 at the front is bolted in place. Then the yoke for the operating lever is secured to the eccentric cover by means of the splines 133 and a locking ring 136 is screwed in place to hold said yoke on the cover, and the setscrew 137 is set in place.

Thereafter the splined hub of the flexible coupling 19 is slipped upon the outer end of the shaft 20.

The brake shoes may next be put in place by inserting them one at a time through the opening 56 in the top of said extension 7, the pins 46 and 47 being readily passed through the holes in the anchor plug and suitably secured in place. The link 63 is connected between the lever 60 and the shoe 40 and the spring 64 is connected to the lever 60. The shoes are then permitted to project outwardly against the pins 65 to center the brake shoes in their proper position.

The assembly of the propeller shaft with its bearings, the brake drum and the bull gear is accomplished as follows: The locking ring 29 is first slipped over the rear end 23 to a point adjacent the propeller clamping flange. The front bearing is then assembled on the shaft and locked in place. The shaft with the bearing and ring in place is then inserted to the front end of the housing 7. The front bearing and its retaining ring may be now put in place. The brake drum 38 is next slid axially over the front end of the shaft extension 23, the splined portion of the hub of said brake drum meshing with the splines on the shaft. The opening through the wall 70 is large enough to permit the brake drum 38 to be passed through. The baffle plate 71 is then put in place to close the opening in the wall 70. The bull gear 22 with the baffle plate 71 and oil throwing ring 75 are inserted into casing 25 from below and through the opening which is later covered by the oil sump and held in place by the pinions 16 and 21, while the end of the shaft 23 is passed therethrough. The bolts which hold the baffle plate 71 are then fastened in place. The rear bearing 77 for the bull gear 22 is then mounted first in the barrel 80, then said barrel with the bearing therein are mounted upon the hub of the bull gear and the locking ring which holds the inner race of said bearing 77 is put in place and the barrel suitably bolted to the main housing 25 by means of the flange 81. The cover plate 82 which retains the outer race in proper position is then screwed into place and fastened by means of the wire locking ring 83.

The rear bearing 24 is then locked in place by means of the ring 24 which is bolted by the cap screws 30.

A suitable breather vent 177 is provided on top of the gear housing 25.

The various parts referred to are all carefully machined and ground wherever possible, the gears being hardened and ground. All of the parts are carefully balanced, and wherever possible the metal which is not necessary for strength is drilled or cut away. For example, the pinions and their shafts are hollowed out as is the main shaft 8 and its extension 23.

The operation will be obvious from the above description. Normally both engines are connected to the propeller for driving the cam forward. To reverse the engines are first declutched at the friction clutches 178. Then the brake is applied to the propeller shaft and the same is stopped. The jaw clutch 14 is then declutched and then the shiftable pinion may be moved through neutral to reverse position. It is advisable to stop both the driving shafts and the propeller shaft for shifting gear. The friction clutches on the engine and the brake on the propeller shaft are provided to permit of this action.

It will be noted that the propeller is properly geared down by the driving pinions and bull wheel to give a proper air speed. This gear ratio may be varied as desired without departing from the invention.

I do not intend to be limited to the details shown or described.

I claim:—

1. In combination, a frame comprising a pair of outer sills and a center sill between them, a transmission spanning said outer sills, a pair of engines connected to said transmission, said engines being mounted one on each of said outer sills and upon the common center sill and staggered with respect to each other, one of said engines having a relatively long transmission shaft having a limited degree of flexibility, the other engine having a relatively short transmission shaft, a common propeller shaft adapted to be driven by both of said engines, gears in the transmission connecting said engine transmission shafts with said propeller shaft, one of said gears being connected to said flexible transmission shaft and being movable laterally.

2. In combination, a first driven member, a reversing element associated with the said first driven member, a pair of elements for actuating the said first driven member, a pair of power driven members for driving said elements, one of said driven members having a limited degree of flexibility, and means for moving the element associated with the said flexible member laterally from said first driven member and into engagement with the reversing element.

3. In combination, a first driven member, a pair of elements for actuating the said driven member, a reversing element associated with the said first driven member, a pair of engines for driving the said element, said engines being staggered with respect to each other, a pair of connections between the said elements and the engines, one of the said connections having a limited degree of flexibility, and means for moving the element associated with the said flexible connection laterally from said first driven member and into engagement with the reversing element.

4. In combination, a frame, a driven shaft having a bull wheel, a driving pinion meshing with said bull wheel, a driving motor, a shaft connecting said driving pinion with said motor, said shaft including a pair of flexible couplings, an eccentric mounted in said frame, said pinion having bearings in said eccentric, a reversing gear idler mounted in said frame and meshing with said bull wheel, and means for moving the eccentric for moving said driving pinion out of mesh with the bull wheel and into mesh with the reverse idler gear.

5. In combination, a gear housing having a forwardly extending portion, a driven shaft projecting through said forwardly extending portion and having a bearing therein at its outer end, a bull wheel mounted at the opposite end of said shaft, said bull wheel being splined to the shaft, a bearing in the housing for said bull wheel, a pair of pinions meshing with said bull wheel and having bearings in said housing, said pinions being placed at the sides of the bull wheel, means for driving said pinions, and a brake drum in said extension of the housing splined to said driven shaft.

6. In combination, a gear housing having an extended portion, a driven shaft having a bearing at the outer end of said extended portion, a brake drum mounted on said driven shaft and disposed within said extending portion, said brake drum being splined to said shaft, a bull wheel adjacent said brake drum, said bull wheel being disposed within said gear housing and being splined upon the forward end of said shaft, a pair of separate driving means for said driven shaft comprising pinions meshing with said bull wheel, brake shoes mounted in said extension for cooperation with the said brake drum, and means for disconnecting said driving means from said driven shaft.

7. In combination, a gear casing having a housing formed integral therewith and supporting an outboard bearing, a driven shaft mounted in said outboard bearing and extending through said housing into said gear casing, said gear casing having an axial opening in line with said shaft, a brake drum adapted to be passed through said opening and keyed on the driven shaft, said gear casing being open at the bottom, a bull gear adapted to be passed through said opening and to be mounted upon an end of said driving shaft, a bearing mounted between the hub of said bull wheel and said axial opening in the housing, and a cover for closing said opening.

8. In combination, a gear casing having an extended portion, a bearing in the end of said portion, an axial driven shaft projecting through said bearing into the casing, said casing having an axial opening therethrough in line with said extension, a brake drum adapted to be passed through said opening and mounted upon said shaft, said brake drum being disposed in said extended portion, brake shoes co-operating therewith, operating means extending through said extended portion for operating said brake shoes, a baffle plate for closing off said extended portion from the transverse casing, said casing having an opening in the bottom thereof, a bull gear adapted to pass through said opening, said bull gear being disposed upon said shaft, a bearing housing mounted in a wall of said casing, a bearing mounted in said housing and a cover plate for said housing for locking said bearing in place, and an oil sump closing the opening in the bottom of said case.

9. In a transmission of the class described, a gear casing having an extended portion, a bearing in the outer end of said portion, a shaft extending axially through said portion and being supported in said bearing, a bull gear mounted on an end of said shaft, said casing having an opening axially in line with said shaft and having an opening in the bottom sufficiently large to permit the introduction of said bull gear, a baffle plate closing off the gear casing from said extension, a bearing housing lying in the opening in the said casing, a bearing between said housing and the hub of said bull wheel, and a plate for closing said bearing.

10. In combination, a gear casing having an attached housing, a driven shaft lying axially in said housing and projecting into said casing, said casing having an opening therethrough in line with said housing to permit the introduction of a brake drum, a brake drum mounted on said shaft and lying within said housing, an opening in one side of said housing, a cover plate for said opening, an opening in the opposite side of the wall of said housing, an anchor plug in said opening, brake shoes introduceable into said housing through the first opening, and having their ends pivoted to said anchor plug and an operating handle extending through said closure plate.

11. In combination, a gear casing having an extension, a bearing mounted in said extension, a driven shaft supported in said bearing and projecting into the gear casing, a brake drum keyed on said shaft, said casing having transverse openings in its side walls in line with said extension for introducing said brake drum axially, an engaging shoe mounted in said extension and co-operating with said drum, a gear wheel of a diameter greater than said axial opening in the casing, said casing having a lateral opening for the induction of said gear wheel into the casing, a transverse opening in the side wall of said casing adjacent said first axial opening, an eccentric mounted in said lateral opening of the casing, an operating lever connected to said eccentric, a driving pinion having bearings in said eccentric, said driving pinion being adapted to be brought into and out of mesh with the gear wheel upon movement of said eccentric.

12. In combination, a gear casing having supporting brackets at its outer end, said casing having an opening at its lower end closed by a sump, an extended portion integral with said casing, said casing having three lateral openings, a driven shaft in line with the central opening, driving shafts in line with the other two openings, gears connecting said shafts within the casing and an eccentric mounting in one of said openings for one of said gears.

13. In combination, a casing having a central transverse opening therethrough, a driven shaft mounted in said casing centrally of said opening, a bull gear associated with the said shaft, said casing having an opening in its bottom sufficiently large to permit the introduction of said bull gear into the casing, an oil sump closing said opening, and an oil pump having a gear meshing with said bull gear and mounted in said sump.

14. In combination, a gear casing, a driven shaft extending into said casing, said casing having an opening in its bottom, a bull gear adapted to be introduced through said opening, said shaft being introduced axially through the hub of the bull gear, a bearing for the bull gear mounted in said casing, said casing having openings extending thereinto parallel with the axis of the driven shaft, driving pinions meshing with the bull gear mounted in said openings, and an eccentric between the bearings of one of said pinions and its corresponding opening.

15. In combination, a casing, openings in the opposite sides of said casing, a driven shaft extending into said opening, a bull gear in said casing mounted on said shaft, a bearing mounted between the bull gear and one of the walls of said casing, said bearing being introduced through one of said openings, said casing having a larger opening adapted to permit the bull gear to be inserted laterally, said casing having a pocket therein, openings extending through the side walls of said pocket, a pin lying in said opening, a reverse idler gear mounted on said pin, a circular eccentric drum mounted in said casing, a pinion having bearings in said eccentric thereof, and means for moving said eccentric to bring the pinion into mesh with the bull gear or with the idler pinion.

16. In combination, a gear casing having an extension, a propeller shaft having a bearing in an end of said extension, a bull gear mounted on an end of said shaft, said casing having a lateral opening therethrough of smaller diameter than the gear wheel, a bearing between said gear wheel and the wall of the casing, a brake drum mounted on the propeller shaft within said extension, a brake shoe for said drum having an operating member extending out of said extension, the said casings having transverse openings, one on each side of the propeller shaft, pinions having driving shafts with bearings mounted in said openings, cover plates for said openings and an eccentric between the bearings of one of said pinions and the adjacent walls of the casing, said pinions being adapted to mesh with said first named gear.

17. In combination, a transmission comprising a bull gear, a pair of driving pinions, a pair of engines in line axially with the pinions, said engines being staggered, a pair of flexible joints and a shaft connecting the remote engine with its pinion, means for moving said latter pinion laterally to disengage it from the bull gear, and a reverse pinion in mesh with the bull gear adapted to be engaged by said pinion when the same is moved laterally to provide a reverse drive.

18. In an aerial vehicle, the combination of a propeller shaft, a brake for said shaft, a pair of driving shafts, engines therefor, gears between said driving shafts and said propeller shaft, said gears comprising a reverse gear, and releasable friction clutches between the engines and said driving shafts.

19. In combination, a propeller shaft, a brake for said shaft, a pair of driving shafts, engines therefor, gears between said driving shafts and said propeller shaft, means for disconnecting one of said driving shafts from said gears, means for moving the other driving shaft laterally with respect to said propeller shaft, said gears including a reverse gear, and means for disconnecting the engines from said driving shafts.

In witness whereof, I hereunto subscribe my name this 29th day of September, 1923.

THOMAS L. FAWICK.